United States Patent [19]

Ogawa

[11] Patent Number: 4,473,243
[45] Date of Patent: Sep. 25, 1984

[54] SHOULDER WEBBING ANCHORING DEVICE

[75] Inventor: Hisashi Ogawa, Okazaki, Japan

[73] Assignee: Toyota Jidosha Kogyo Kabushiki Kaisha, Aichi, Japan

[21] Appl. No.: 343,475

[22] Filed: Jan. 28, 1982

[30] Foreign Application Priority Data

Feb. 12, 1981 [JP] Japan .................................. 56-19429

[51] Int. Cl.³ ............................................ B60R 21/00
[52] U.S. Cl. .................................... 280/808; 297/483; 297/486
[58] Field of Search ........................ 280/802, 804, 808; 297/469, 475, 479, 483, 486

[56] References Cited

U.S. PATENT DOCUMENTS 4,253,681  3/1981  Barnett ................................ 280/808
4,262,932  4/1981  Motovami et al. ................. 280/806

Primary Examiner—Richard A. Bertsch
Attorney, Agent, or Firm—Parkhurst & Oliff

[57] ABSTRACT

A shoulder webbing anchoring device according to the present invention includes a side anchor fixed on a window frame or a side wall of a vehicle body and a webbing anchor holding one end of the webbing and coupled to the side anchor through an anchor pin having an enlarged head. The side anchor has small and large diameter holes partially overlapping each other, the small diameter hole being smaller than the enlarged head and the large diameter hole being larger than the enlarged head, whereby when the anchor pin is in the small diameter hole, the webbing anchor is rotatably coupled with the side anchor, and when the anchor pin is in the large diameter hole, the webbing anchor is allowed to be separated from the side anchor.

19 Claims, 6 Drawing Figures

SHOULDER WEBBING ANCHORING DEVICE

BACKGROUND OF THE INVENTION

1. Field of the Invention p This invention relates to a shoulder webbing anchoring device used in a seatbelt system for protecting an occupant in a vehicular emergency situation, and more particularly to a shoulder webbing anchor securing an occupant restraining webbing to a side wall of a vehicle.

2. Description of the Prior Art

Heretofore, there has been proposed an automatic seatbelt system for automatically fastening a restraining webbing over an occupant upon his entering the vehicle and closing a vehicle door. In the automatic seatbelt system of the type described, the anchor portion of a shoulder webbing is to move back and forth in the vehicle in accordance with the opening or closing of the door, a driving force of a motor or the like, to thereby automatically fasten the webbing over or release the occupant from the webbing. Consequently, upon entering the vehicle, the occupant is automatically brought into a webbing fastened condition, thereby improving the safety of the occupant.

In the automatic seatbelt system of the type described, it is preferable to provide the shoulder webbing as high as possible in order to improve the performance of restraining the chest of the occupant. Although it is the case with conventional seatbelt systems, demand for the abovedescribed arrangement is particularly strong in the automatic seatbelt system in which the restrainment of the occupant tends to become imperfect.

However, if the shoulder webbing anchor is provided at a high position, then the occupant with a small physical build suffers from discomfort when the shoulder webbing is disposed around his neck.

SUMMARY OF THE INVENTION

The present invention has been developed to obviate the abovedescribed disadvantages and has as its object the provision of construction of a shoulder webbing anchoring device in which a position of securing a shoulder webbing anchor is adjustable to thereby give a proper webbing fastened position to occupants having varied physical builds, and in which the shoulder webbing anchor is easily disengaged from a side wall of the vehicle through a simple operation, to thereby facilitate the securing of an infant and so forth if necessary.

The shoulder webbing anchoring device according to the present invention includes a side anchor fixed on a side wall of a vehicle body and a webbing anchor holding one end of the webbing and coupled to the side anchor through an anchor pin having an enlarged head. The side anchor has small and large diameter holes partially overlapping each other, the small diameter hole being smaller than the enlarged head and the large diameter hole being larger than the enlarged head, whereby when the anchor pin is in the small diameter hole, the webbing anchor is rotatably coupled with the side anchor, and when the anchor pin is in the large diameter hole, the webbing anchor is allowed to be separated from the side anchor. The shoulder webbing anchoring device also has a holder means or plate for resiliently holding the anchor pin within the small diameter hole of the side anchor. A projection is provided on the holder means and a plurality of receiving members for the projection are provided on the webbing anchor equidistantly from the anchor pin, whereby the rotational angle of the webbing anchor with respect to the side anchor is restricted to the extent that the projection engages the receiving members.

As a result, the webbing anchor holding the webbing can be separated from the side wall of the vehicle body by a simple operation such as releasing the holder means and moving the anchor pin to the large diameter hole of the side anchor. The webbing anchor also premits the placement of the webbing around the occupant to be adjusted by a simple operation such as rotating the webbing anchor around the small diameter hole until the projection of the holder means engages one of the receiving members.

DESCRIPTION OF THE PREFERRED EMBODIMENTS

Description will hereunder be given of the embodiments of the present invention with reference to the drawings.

Figure 1:
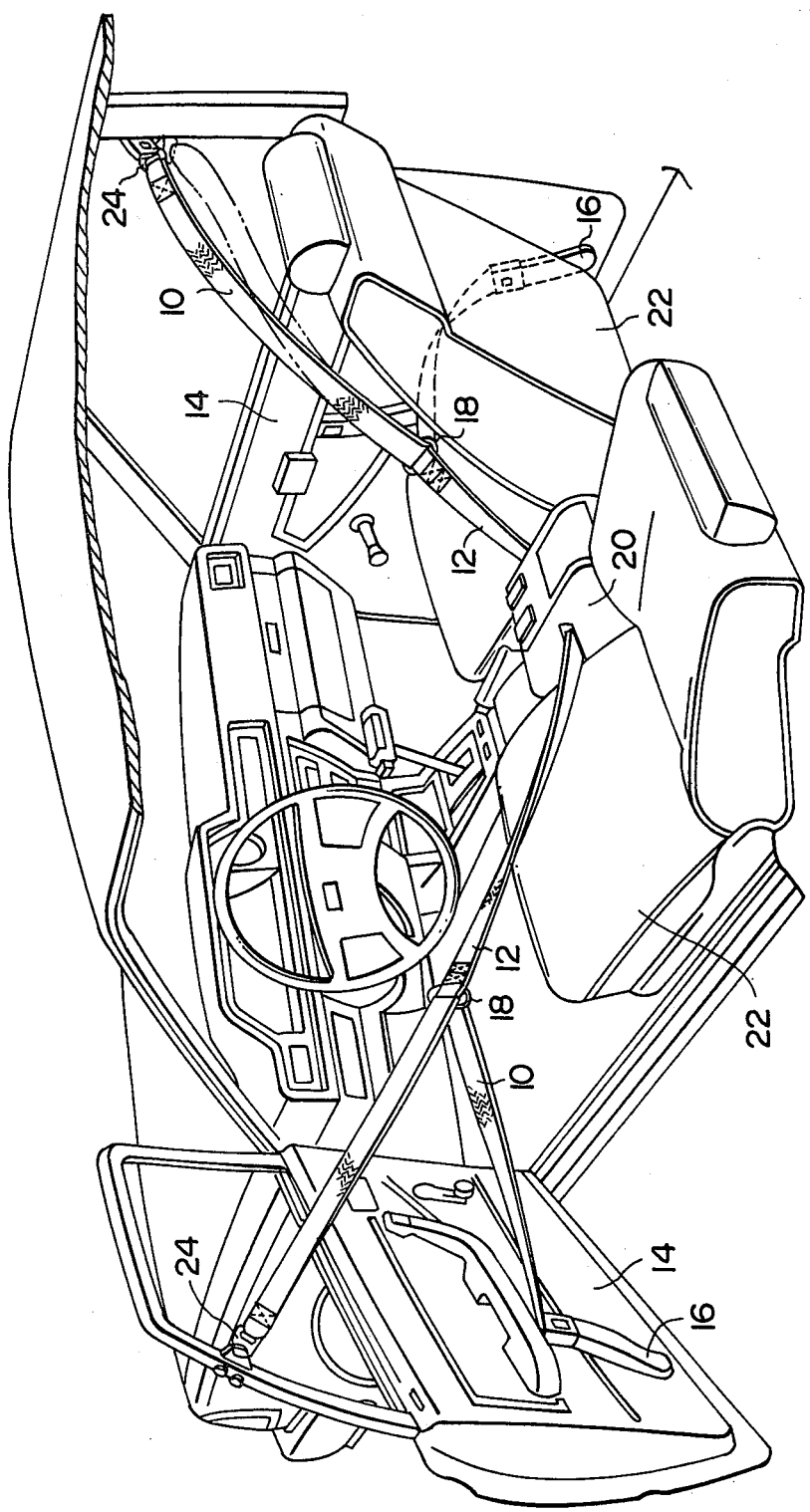
FIG. 1 is a perspective view showing the inside of a vehicle to which an embodiment of the shoulder webbing anchoring device according to the present invention is applied.

FIG. 1 shows an embodiment wherein the present invention is applied to a seatbelt system in which the webbings are automatically fastened over or receded from an occupant by utilizing the opening or closing of a vehicle door.

More specifically, in this embodiment, an occupant restraining webbing includes an outer webbing 10 and inner webbing 12. The outer webbing is secured at one end thereof to an upper and rear end portion of a vehicle door 14 and at the other end thereof to a lower end portion of the door 14 through a buckle device 16. The intermediate portion of this outer webbing 10 is turned around at a ring 18 secured to the forward end of the inner webbing 12, and the base end of the inner webbing 12 is wound into a retractor 20 provided at substantially the central portion of the vehicle. This retractor 20 retracts the inner webbing 12 in layers by a biasing force and incorporates therein an inertia lock mechanism for abruptly stopping the unwinding of the inner webbing 12 in a vehicular emergency situation.

With the arrangement of the webbings as described above, if the occupant opens the door 14, then a space for allowing the occupant to enter the vehicle is provided between the webbings and a seat 22 as shown at the driver's seat side in FIG. 1. When the occupant closes the door 14 upon his seating, then the webbings 10 and 12 are automatically fastened around the occupant as shown at the other seat side in FIG. 1.

Here, a portion of the outer webbing 10 extending upward from the ring 18 functions as a shoulder webbing, and the other portion thereof extending downward from the ring 18 functions as a lap webbing.

Figure 2:
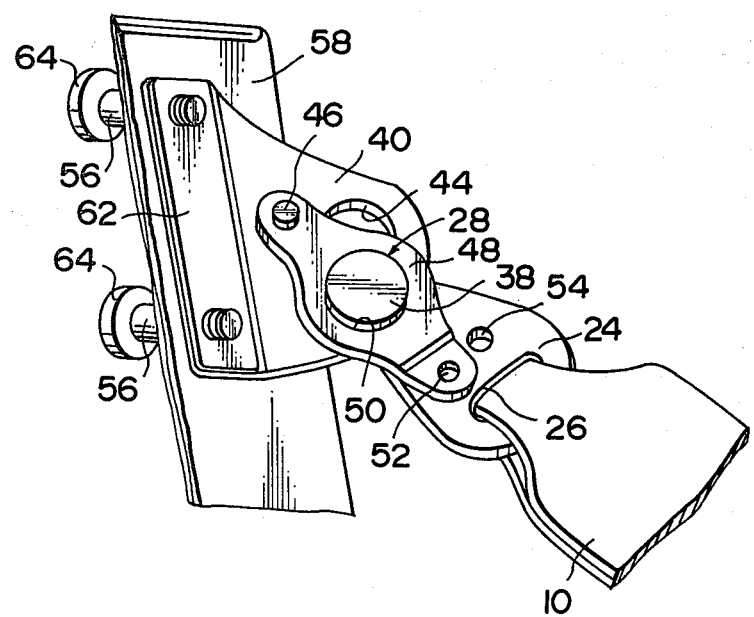
FIG. 2 is an enlarged perspective view showing a first embodiment of the shoulder webbing anchoring device according to the present invention.

Detailed description will now be given of construction of an anchor for securing one end of the outer webbing 10 functioning as the shoulder webbing to the door 14 with reference to FIGS. 2 and 4.

The end of the outer webbing 10 is turned back through a slot 26 formed in a webbing anchor plate 24 and is sewn onto itself, whereby the webbing anchor plate 24 is secured to one end of the outer webbing 10. Solidly secured to the other end of this webbing anchor plate 24 is an anchor pin 28. A small diameter portion 30 of this anchor pin 28 extends through the anchor plate 24, and the forward end of the small diameter portion 30 is applied with pressure to be formed into a clinched head 32 after inserted through the anchor plate 24. This clinched head 32 and a large diameter portion 34 of the anchor pin 28 clamp or hold the anchor plate 24 therebetween. A spacer 36 is previously coupled onto the outer periphery of the large diameter portion 34, which has an enlarged head 38 at the side opposite to the small diameter portion 30.

The anchor pin 28 is engaged with a side anchor plate 40 fixed to a window frame and so forth, whereby the webbing 10 is supported on the door 14 constituting a portion of the side wall of the vehicle. Detailed description will now be given of this mounting. A small diameter hole 42 and large diameter hole 44 partially overlapping each other are formed in the side anchor plate 40. The inner diameter of the small diameter hole 42 is as large as a size through which the spacer 36 can be inserted, but smaller than the enlarged head 38, and the inner diameter of the large diameter hole 44 is larger than the enlarged head 38.

Figure 3:
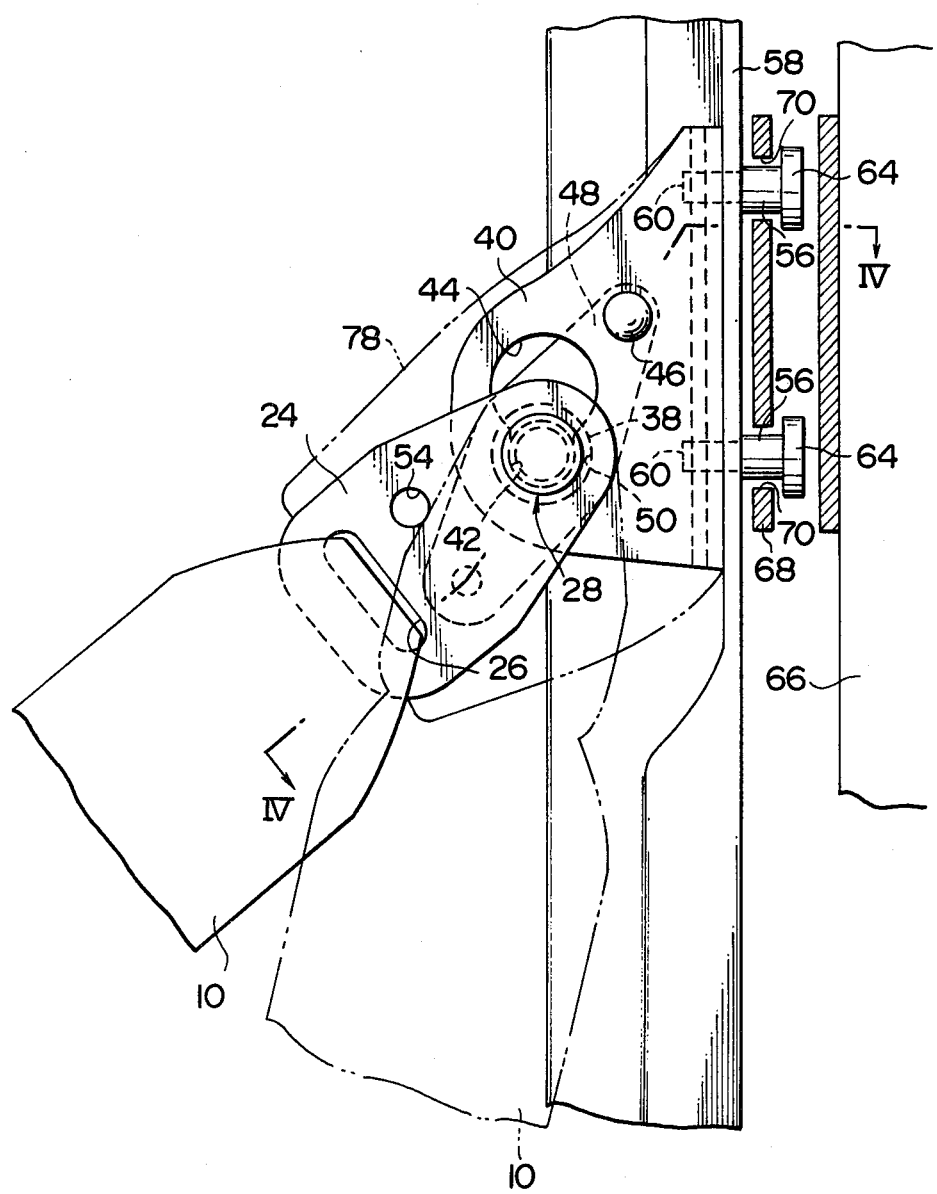
FIG. 3 is a partially cross-sectional side view of the device in FIG. 2.

Consequently, when the large diameter portion 34 of the anchor pin 28 is inserted through the small diameter hole 42, the webbing anchor plate 24 is engaged with the side anchor plate 40. When the anchor pin 28 is located in the large diameter hole 44 and further moved in the axial direction thereof, the enlarged head 38 passes through the large diameter hole 44, so that the anchor plate 24 can be disengaged from the side anchor plate 40. Here, the anchor pin 28, small diameter hole 42 and large diameter hole 44 constitute an engaging mechanism. Furthermore, as shown in FIG. 3, from the viewpoint of safety, the small diameter hole 42 of the side anchor plate 40 is provided at a position downwardly of the large diameter hole 44.

A holder plate 48 is secured to the side anchor plate 40 at the side where the enlarged head 38 protrudes through a pin 46 extending through the side anchor plate 40 adjacent the large diameter hole 44. Penetrated through the intermediate portion of the holder plate 48 is a retaining round hole 50 for holding the enlarged head 38, which is slightly larger in diameter than the enlarged head 38 of the anchor pin 28, and the holder plate 48, which is, for example, made of resilient material, is biased in a manner to closely be attached to the side anchor plate 40. Consequently, the enlarged head 38 projecting from the side anchor plate 40 is received by the retaining round hole 50 of the holder plate 48, so that the anchor pin 28 is prevented from moving toward the large diameter hole 44, whereby the webbing anchor plate 24 is prevented from being disengaged from the side anchor plate 40. However, if this holder plate 48 is resiliently deformed by an external force and separated from the side anchor plate 40 as indicated by two-dotted chain lines in FIG. 4, then the retaining round hole 50 is separated from the enlarged head 38, so that the anchor pin 28 can move toward the small diameter hole 42.

A semispherical projection 52 projects from the forward end of the holder plate 48 toward the webbing anchor plate 24. This projection 52 is opposed to a plurality of round receiving holes or members 54 (two round holes in this embodiment) provided in the webbing anchor plate 24. More specifically, in normal condition, the semispherical projection 52 of the holder plate 48 is received in any one of the round receiving holes 54, so that the holder plate 48 functions as a click motion mechanism for preventing the webbing anchor plate 24 from rotating about the anchor pin 28. Because of this, if an external force beyond a predetermined value is applied to the webbing anchor plate 24 about the anchor pin 28, then the webbing anchor plate 24 rotates until the other round receiving hole 54 receives therein the semispherical projection 52. The round receiving holes 54 may be replaced with recesses having a suitable depth. Furthermore, the holder plate 48 may be either rotatable or non-rotatable about the pin 46.

The other side of the side anchor plate 40 is solidly secured to a window frame 58 through a pair of bolts 56. A small diameter threaded portion 60 of each of the pair of bolts 56 extends through the window frame 58 and side anchor plate 40 from behind in the vehicle and is threadably coupled to a subplate 62. An enlarged head 64, formed on the bolt 56 at the rear end as viewed in the longitudinal direction of the vehicle, is opposed to a clevis 68 solidly secured to a center pillar 66. This clevis 68 is U-shaped, the fork of which extends outward of the vehicle body, in a planar view as shown in FIG. 4. The bolts 56 are received in slots 70 formed on the fork of the clevis 68 when the door is closed, whereby the enlarged head 64 can be stored into the clevis 68 as shown in FIG. 3. Consequently, the movement of the enlarged head 64 in a forward direction of the vehicle is restricted by the clevis 68, so that a tension of the outer webbing 10 is imparted to the center pillar 66.

Figure 4:
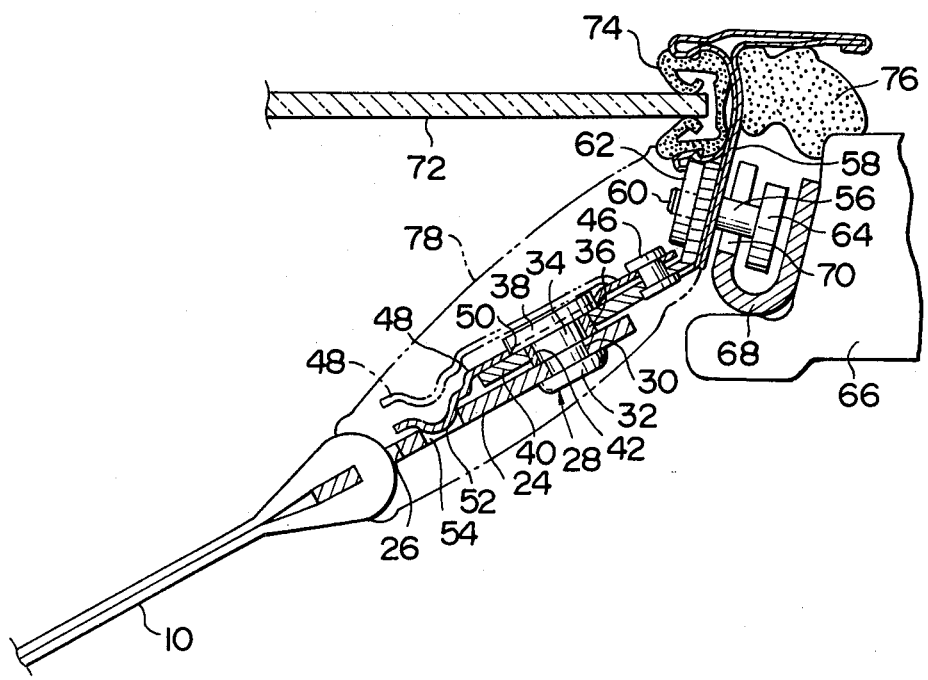
FIG. 4 is a sectional view taken along the line IV—IV in FIG. 3.

In FIG. 4, designated by 72 is a window pane, by 74 is a glass run, by 76 is a weather strip, by 78 is a dust cover for covering the webbing anchor plate 24, side anchor plate 40, holder plate 48 and the like.

Description will hereunder be given of operation and action of the present embodiment with the abovedescribed embodiment.

As shown by the driver's seat side in FIG. 1, if the occupant opens the door 14 for entering the vehicle, then the webbings 10 and 12 are moved forwardly in the vehicle in accordance with a circularly arcuate opening motion of the door 14, so that a space for allowing the occupant to enter the vehicle is formed between the webbings and the seat. If the occupant closes the door 14 upon his entering the vehicle, then the occupant can be brought into a three point webbing fastened condition as shown at the other seat side in FIG. 1.

In case the vehicle falls in an emergency situation such as a collision, the inertia lock mechanism in the retractor 20 is operated to abruptly stop the unwinding of the inner webbing 12. In this situation, the occupant is violently moved in the direction of the collision, whereby a high tension is generated in the webbings 10 and 12. This tension is imparted to the opposite ends of the outer webbing 10 through the outer webbing 10, and part of the tension in one end is imparted to the door 14 through the buckle device 16 and the rest of the tension in the other end is imparted to the door 14 through the webbing anchor plate 24. Particularly, at the webbing anchor plate 24, the anchor pin 28 is engaged with the side anchor plate 40, whereby the tension in the webbing is imparted to the window frame 58 through this side anchor plate 40. While the tension of the webbing is imparted to the window frame 58, the enlarged head 64 of the bolt 56 is engaged with the clevis 68, whereby the window frame 58 is prevented from being deformed beyond a predetermined value, so that the tension of the webbing can be reliably supported by the center pillar 66, thereby protecting the occupant safely.

When the occupant opens the door 14 from the inside of the vehicle, the webbings which have been placed over the occupant are automatically unfastened from the occupant again as shown at the driver's seat in FIG. 1 and he can leave the vehicle.

If an occupant with a different physical build from the previous occupant pulls downwardly the outer webbing 10, which is also the shoulder webbing, then the anchor plate 24 rotates about the anchor pin 28, as indicated by two-dotted chain lines in FIG. 3, whereby the semispherical projection 52 of the holder plate 48 slips out of one of the round holes 54 to the other where the anchor plate 24 is prevented from rotating further. By this, the occupant can easily change the shoulder webbing fastened position, for example, as indicated by two-dotted chain lines in FIG. 1, so that a proper webbing fastened position can be given to occupants having various physical builds.

In order to restrain an infant rested on the seat 22 with the outer webbing 10 and inner webbing 12, it is necessary to separate the outer webbing 10 from the side anchor plate 40. In this case, the holder plate 48 should be resiliently deformed to be separated from the side anchor plate 40 as indicated by two-dotted chain lines in FIG. 4, whereby the enlarged head 38 of the anchor pin 28 slips off the retaining round hole 50 of the holder plate 48. Consequently, the enlarged head 38 can be located into the large diameter hole 44 of the side anchor plate 40 to remove the anchor pin 28 through the large diameter hole 44, thus enabling to remove the end of the outer webbing 10 from the window frame.

Figure 5:
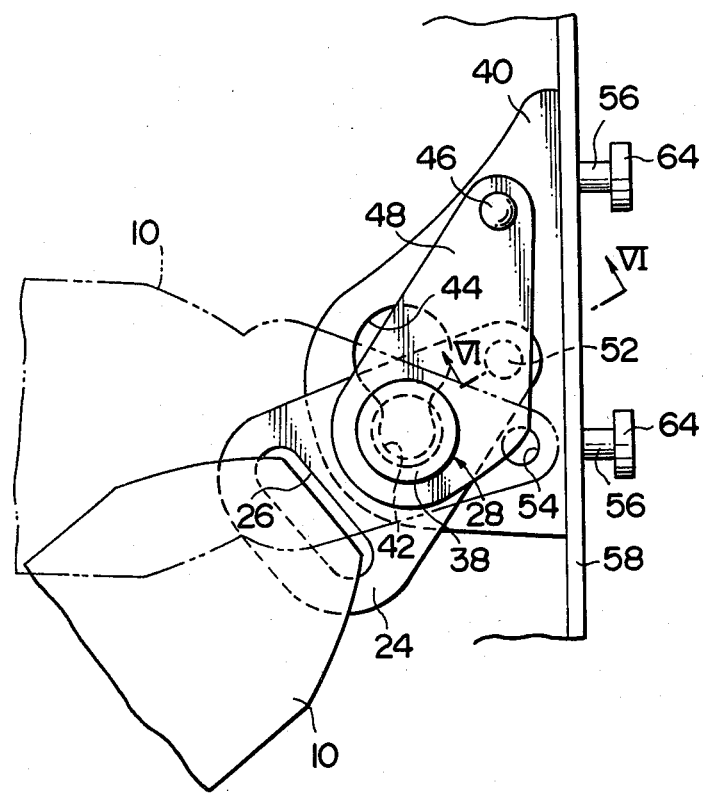
FIG. 5 is a side view showing a second embodiment of the shoulder webbing anchoring device according to the present invention.
Figure 6:
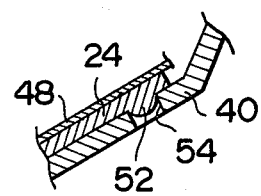
FIG. 6 is a sectional view taken along the line VI—VI in FIG. 5.

FIGS. 5 and 6 show a second embodiment of the present invention, and particularly another embodiment of the click motion mechanism for controlling the rotations of the webbing anchor plate 24 and the side anchor plate 40.

In this embodiment, the semispherical projection 52 is provided on the webbing anchor plate 24 at the opposite side from the slot thereof, which projection projects toward the side anchor plate 40. This semispherical projection 52 is opposed to a plurality of round holes 54 formed in the side anchor plate 40 and equidistantly arranged from the small diameter hole 42 of the side anchor plate 40. Furthermore, the holder plate 48 is abutting against the surface of the webbing anchor plate 24 opposite the semispherical projection 52, whereby the semispherical projection 52 is biased toward the side anchor plate 40 by a biasing force of the holder plate 48.

Consequently, in this embodiment also, the rotation of the webbing anchor plate 24 relative to the side anchor plate 40 is controlled by the biasing force of the holder plate 48 together with the round holes 54, whereby the webbing anchor plate 24 constitutes a click motion mechanism, so that the occupant can select the optimum shoulder webbing fastened position. The shoulder webbing 10 can be separated from the side anchor plate 40 as necessary in the same manner as in the preceding embodiment.

In addition to the respective embodiments as described above, description has been given to the seatbelt system in which the outer webbing 10 is secured to the door 14, whereby the webbing is automatically placed around or receded from the occupant by the opening and closing of the door. However, needless to say, the present invention can be applied to a seatbelt system in which the outer webbing or inner webbing is moved by a driving force of a motor or the like to automatically fasten the webbings around or unfasten the same from the occupant, or to an ordinary seatbelt system in which the webbings are manually fastened.

What is claimed is:

1. A shoulder webbing anchoring device for securing an occupant restraining webbing to a vehicle body, comprising:
    a side anchor fixed on a side wall of the vehicle body;
    a webbing anchor for holding one end of the webbing, said webbing anchor being connected to said side anchor;
    detachable and rotatable coupling means for adjustably and rotatably connecting said webbing anchor to said side anchor and allowing said webbing anchor to be selectively disengaged from said side anchor;
    holder means for resiliently holding said coupling means such that said webbing anchor is rotatably connected to said side anchor; and
    click motion means for adjustably maintaining a rotational angle of said webbing anchor with respect to said side anchor.

2. A shoulder webbing anchoring device as set forth in claim 1, wherein said coupling means comprises:
    an anchor pin on said webbing anchor;
    a portion defining a small diameter hole in said side anchor, said small diameter hole rotatably holding said anchor pin; and
    a portion defining a large diameter hole in said side anchor, said large diameter hole being communicated with said small diameter hole and allowing said anchor pin to be separated from said side anchor.

3. A shoulder webbing anchoring device as set forth in claim 2, wherein said anchor pin comprises:
    a small diameter portion extending through said small diameter hole; and
    an enlarged head, the diameter of said enlarged head being larger than the diameter of said small diameter hole and smaller than the diameter of said large diameter hole.

4. A shoulder webbing anchor device as set forth in claim 3, wherein said small diameter hole is lower than said large diameter hole.

5. A shoulder webbing anchor device as set forth in claim 3, wherein said holder means has a retaining hole to recieve said enlarged head of said anchor pin located in said small diameter hole.

6. A shoulder webbing anchoring device as set forth in claim 1 or 5, wherein said holder means is made of a resilient material.

7. A shoulder webbing anchoring device is set forth in claim 1, wherein said click motion means comprises:
    a projection on said holder means opposed to said webbing anchor; and means for receiving said projection, said means defining a plurality of receptacles provided at a plurality of portions on said webbing anchor, said portions being equidistant from a rotational center of said webbing anchor, whereby the rotational angle of said webbing anchor with respect to said side anchor is restricted to the extent that said projection engages one of said receptacles.

8. A shoulder webbing anchoring device as set forth in claim 1, wherein said click motion means comprises:
a projection on said webbing anchor opposed to said side anchor; and
means for receiving said projection, said means defining a plurality of receptacles provided at a plurality of portions equidistant from a rotational center of said webbing anchor on said side anchor, whereby the rotational angle of said webbing anchor with respect to said side anchor is restricted to the extent that said projection engages one of said receptacles.

9. A shoulder webbing anchoring device as set forth in claim 1, wherein said side wall of the vehicle body is a window frame of a vehicle door.

10. A shoulder webbing anchoring device as set forth in claim 9, further comprising:
a plurality of bolts solidly securing said side anchor to said window frame, said bolts having an enlarged head;
a clevis solidly secured to a center pillar of the vehicle body, said clevis being adapted to receive said enlarged head of said bolts when said door is closed.

11. A shoulder webbing anchoring device for securing an occupant restraining shoulder webbing to a vehicle body, comprising:
a side anchor plate fixed on a side wall of the vehicle body, said side anchor plate having small and large diameter holes partially overlapping each other, said small diameter hole being located lower than said large diameter hole;
a webbing anchor plate holding one end of the webbing;
an anchor pin on said webbing anchor plate adapted for insertion into said small and large diameter holes, said webbing anchor plate being rotatable around said small diameter hole when said anchor pin is in said small diameter hole, said anchor pin having an enlarged head larger than said small diameter hole and smaller than said large diameter hole, whereby said webbing anchor plate is rotatably coupled with said side anchor plate when said anchor pin is in said small diameter hole, and said webbing anchor plate is detached from said side anchor plate when said anchor pin is in said large diameter hole;
a resilient holder plate fixed on said side anchor plate and biased toward said webbing anchor plate, said holder plate having a retaining hole for retaining said enlarged head of said anchor pin in said small diameter hole;
a projection on said holder plate opposed to said webbing anchor plate;
a plurality of receiving members corresponding to said projection, said receiving members being located equidistantly from said anchor pin, whereby the rotation of said webbing anchor plate is restricted to the extent that said projection engages said receiving members.

12. A shoulder webbing anchoring device for an occupant restraining shoulder webbing, comprising:
a side anchor plate on a substantially rearward end portion of a vehicle door, said side anchor plate having a relatively large hole and a relatively small hole partially overlapping said large hole and placed below said large hole;
a webbing anchor plate holding the webbing and provided with an anchor pin to be coupled with said large and small holes of said side anchor plate, said large and small holes having diameters such that an enlarged head of said anchor pin is able to pass through said large hole and is unable to pass through said small hole; and
a holder plate including means for receiving said enlarged head of said anchor pin, said holder plate resiliently holding said anchor pin of said webbing anchor plate in said small hole of said side anchor plate at any one of a plurality of relative angular positions between said webbing anchor plate and said side anchor plate, said holder plate permitting release of said anchor pin for movement of the anchor pin from said small hole to said large hole to detach said webbing anchor plate from said side anchor plate.

13. A shoulder webbing anchoring device as set forth in claim 12, wherein said rearward end portion of the vehicle door is defined by a window frame and, at least one bolt protrudes rearwardly from said side anchor plate, said bolt having an enlarged head at the rearward end of said bolt.

14. A shoulder webbing anchoring device as set forth in claim 13, further comprising a clevis on a face of a vehicle body facing said window frame when said door is closed, said clevis receiving said enlarged head of said bolt, whereby a tension on said webbing is imparted to the vehicle body through said webbing anchor plate, said side anchor plate, said bolt and said clevis.

15. A shoulder webbing anchoring device as set forth in claim 12, wherein said holder plate is pivotably mounted on said side anchor plate by a pin.

16. A shoulder webbing anchoring device as set forth in claim 15, wherein said receiving means in said holder plate is a hole, said holder plate includes a projection on a side of said hole opposite to said pin, and said webbing anchor plate includes a plurality of receiving openings for receiving said projection, whereby said webbing anchor plate is selectively fixed in a rotatable position with respect to said side anchor plate when said projection is received in one of said receiving openings.

17. A shoulder webbing anchoring device as set forth in claim 16, wherein said receiving openings in said webbing anchor plate are arranged equidistantly with respect to a center of said anchor pin.

18. A shoulder webbing anchoring device as set forth in claim 12, wherein said holder plate is pivotably mounted on said webbing anchor plate by a pin.

19. A shoulder webbing anchoring device as set forth in claim 12, wherein said webbing anchor plate includes a projection and said side anchor plate includes a plurality of receiving openings for receiving said projection, whereby a rotational position between said webbing anchor plate and said side anchor plate is maintained by the engagement of said projection within one of said receiving openings.

* * * * *